(12) United States Patent
Muther et al.

(10) Patent No.: US 7,497,394 B2
(45) Date of Patent: Mar. 3, 2009

(54) METHOD AND SYSTEM FOR THE TREATMENT OF WASTE

(75) Inventors: Christoph Muther, Hegiswil (CH); Kee Loo Tan, Urdorf (CH)

(73) Assignee: Result Technology AG, Mammern (CH)

( * ) Notice: Subject to any disclaimer, the term of this patent is extended or adjusted under 35 U.S.C. 154(b) by 349 days.

(21) Appl. No.: 10/510,991

(22) PCT Filed: Apr. 30, 2003

(86) PCT No.: PCT/EP03/04510

§ 371 (c)(1),
(2), (4) Date: Jan. 3, 2005

(87) PCT Pub. No.: WO03/103859

PCT Pub. Date: Dec. 18, 2003

(65) Prior Publication Data

US 2005/0103908 A1    May 19, 2005

(30) Foreign Application Priority Data

May 4, 2002   (DE) .............................. 102 19 724

(51) Int. Cl.
*B02C 13/288* (2006.01)
(52) U.S. Cl. ..................... 241/57; 241/79.1; 241/188.1
(58) Field of Classification Search ..................... 241/1, 241/301, 5, 275, 40, 23, 29, 24.15, 101.2, 241/188.1, 188.2, 19, 57, 79.1, 27; 209/135, 209/139.1

See application file for complete search history.

(56) References Cited

U.S. PATENT DOCUMENTS

| | | | |
|---|---|---|---|
| 2,474,314 A | 6/1949 | Koehne | |
| 2,752,097 A | 6/1956 | Lecher | |
| 3,433,422 A * | 3/1969 | Guenther | 241/61 |
| 3,606,182 A | 9/1971 | Warren | |
| 4,214,713 A * | 7/1980 | Wright | 241/57 |
| 4,500,040 A | 2/1985 | Steffens | |
| 4,637,561 A * | 1/1987 | Edberg | 241/154 |
| 4,664,320 A | 5/1987 | Steffens | |
| 4,697,743 A | 10/1987 | Bjorck et al. | |
| 4,721,259 A * | 1/1988 | Shagarova et al. | 241/57 |
| 5,009,371 A | 4/1991 | Nickel | |

(Continued)

FOREIGN PATENT DOCUMENTS

JP    54-149974    11/1979

(Continued)

*Primary Examiner*—Mark Rosenbaum
(74) *Attorney, Agent, or Firm*—Nixon Peabody LLP

(57) ABSTRACT

In a method for treating waste products and recycling products of solid organic or inorganic materials or composite materials or mixtures thereof, a breaking-up or separation of the components by means of an impulse is effected in the composite material or the mixture by a device which suddenly interrupts the flow of said composite material or mixture. Process air is fed in a counter-rotating, rising flow path into the spiral-like downward transport path generated in a rotor having a vertical axis and a shockwave is generated between the layers of the composite material against a deflector wall of the rotor. In addition, two radially spaced, coaxially arranged wall faces rotate relatively to one another about their axis and the composite materials or mixtures moved by centrifugal forces are moved and broken up between deflector faces projecting radially from the deflector walls.

5 Claims, 5 Drawing Sheets

U.S. PATENT DOCUMENTS

| | | | |
|---|---|---|---|
| 5,251,827 A * | 10/1993 | Sims et al. ............... 241/24.21 |
| 5,275,631 A | 1/1994 | Brown |
| 5,353,997 A | 10/1994 | Kasseck |
| 5,597,127 A | 1/1997 | Brown |
| 5,695,130 A | 12/1997 | Csendes |
| 5,850,977 A | 12/1998 | Csendes |
| 5,860,605 A | 1/1999 | Van Der Zanden |
| 5,938,128 A * | 8/1999 | Engel et al. .................... 241/1 |
| 5,961,054 A | 10/1999 | Nishibori |
| 6,110,432 A | 8/2000 | Southwick |
| 6,135,370 A * | 10/2000 | Arnold ......................... 241/1 |
| 6,179,231 B1 | 1/2001 | Csendes |
| 6,360,975 B1 | 3/2002 | Csendes |
| 6,802,466 B1 | 10/2004 | Van Der Zanden |
| 2002/0179754 A1 | 12/2002 | Zanden |

FOREIGN PATENT DOCUMENTS

| WO | WO 93 05883 | 4/1993 |
|---|---|---|
| WO | WO 95 25595 | 2/1995 |

\* cited by examiner

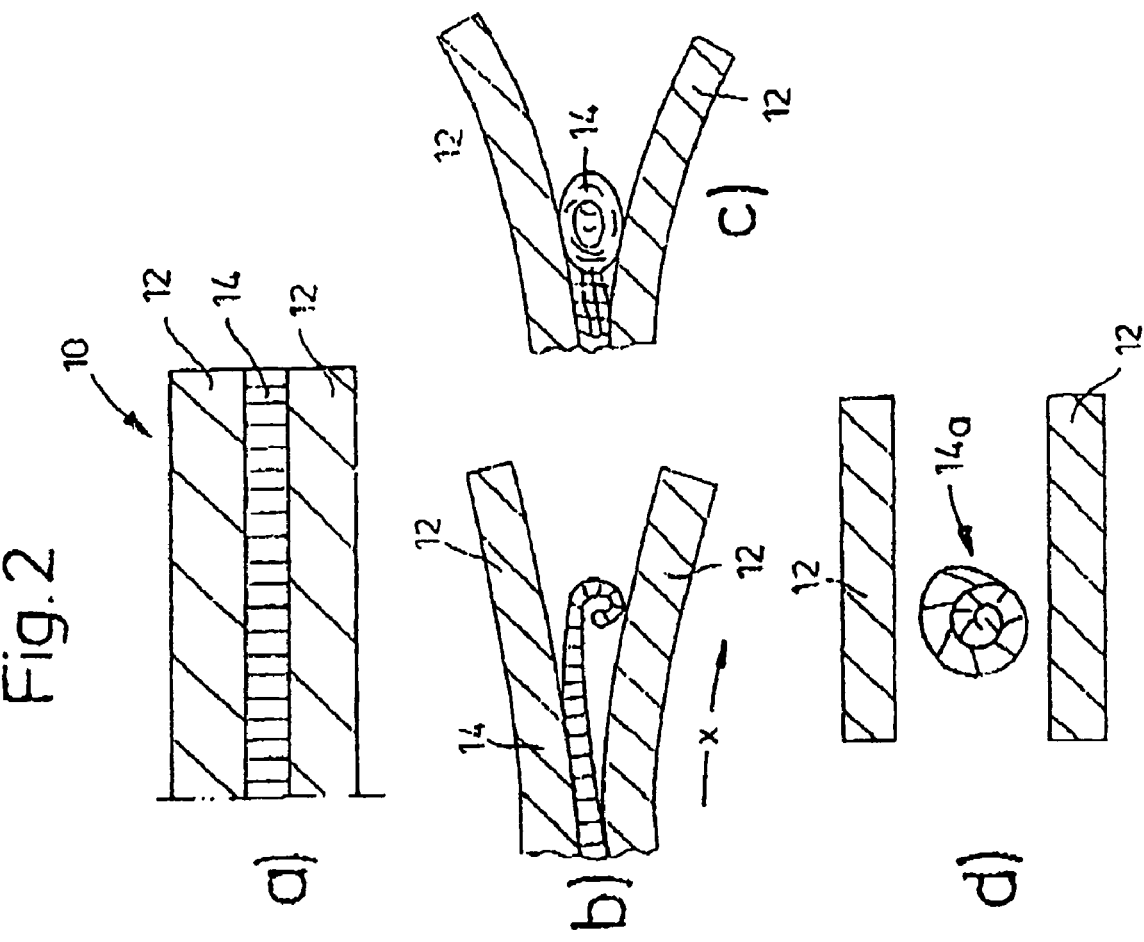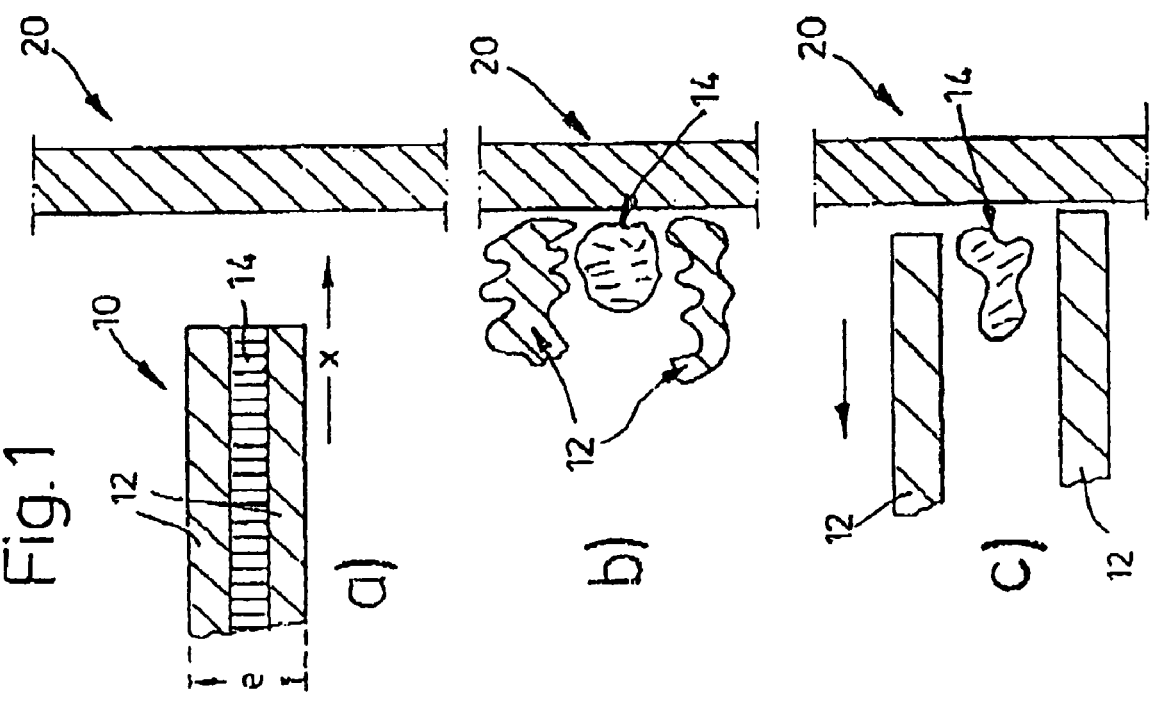

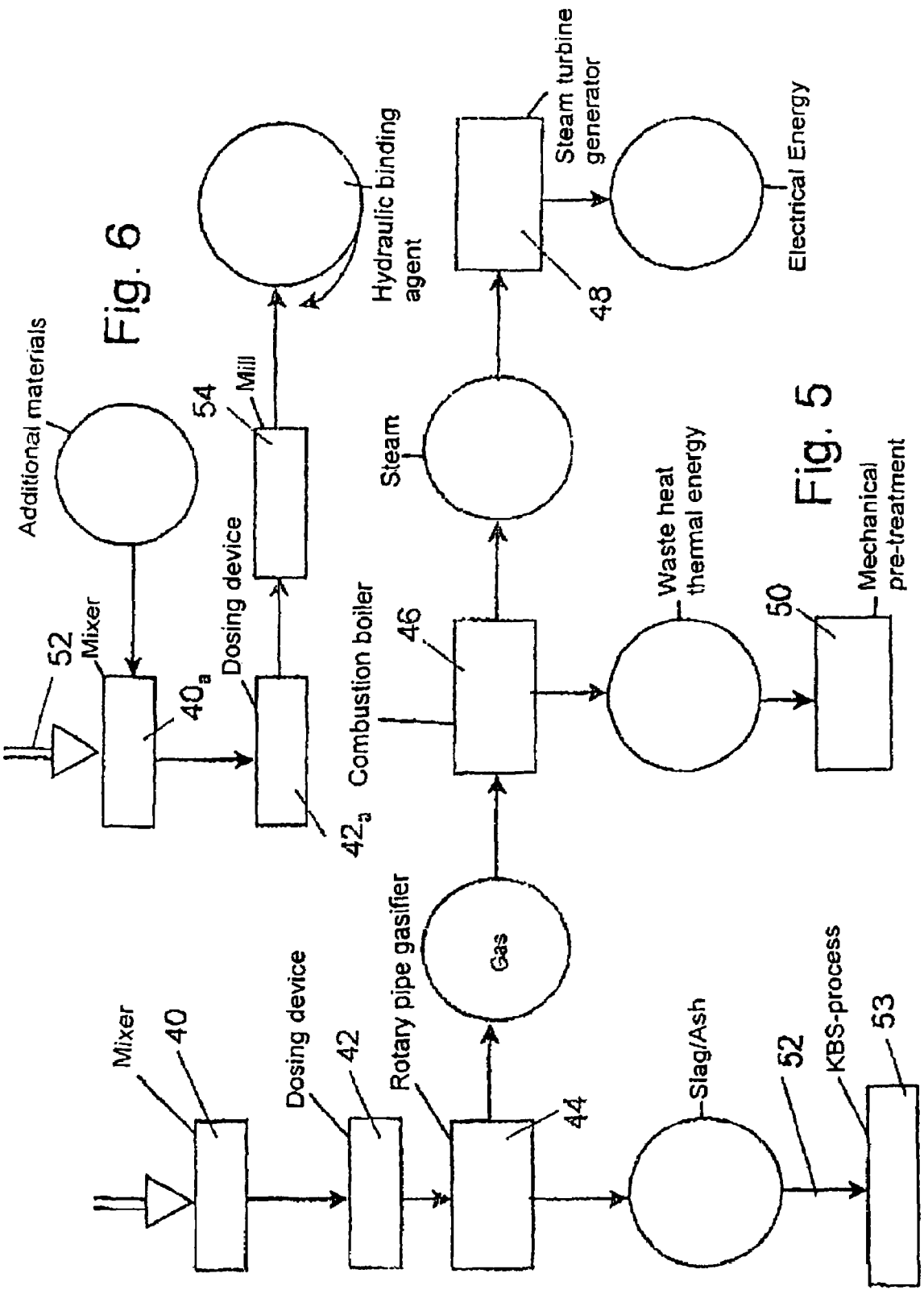

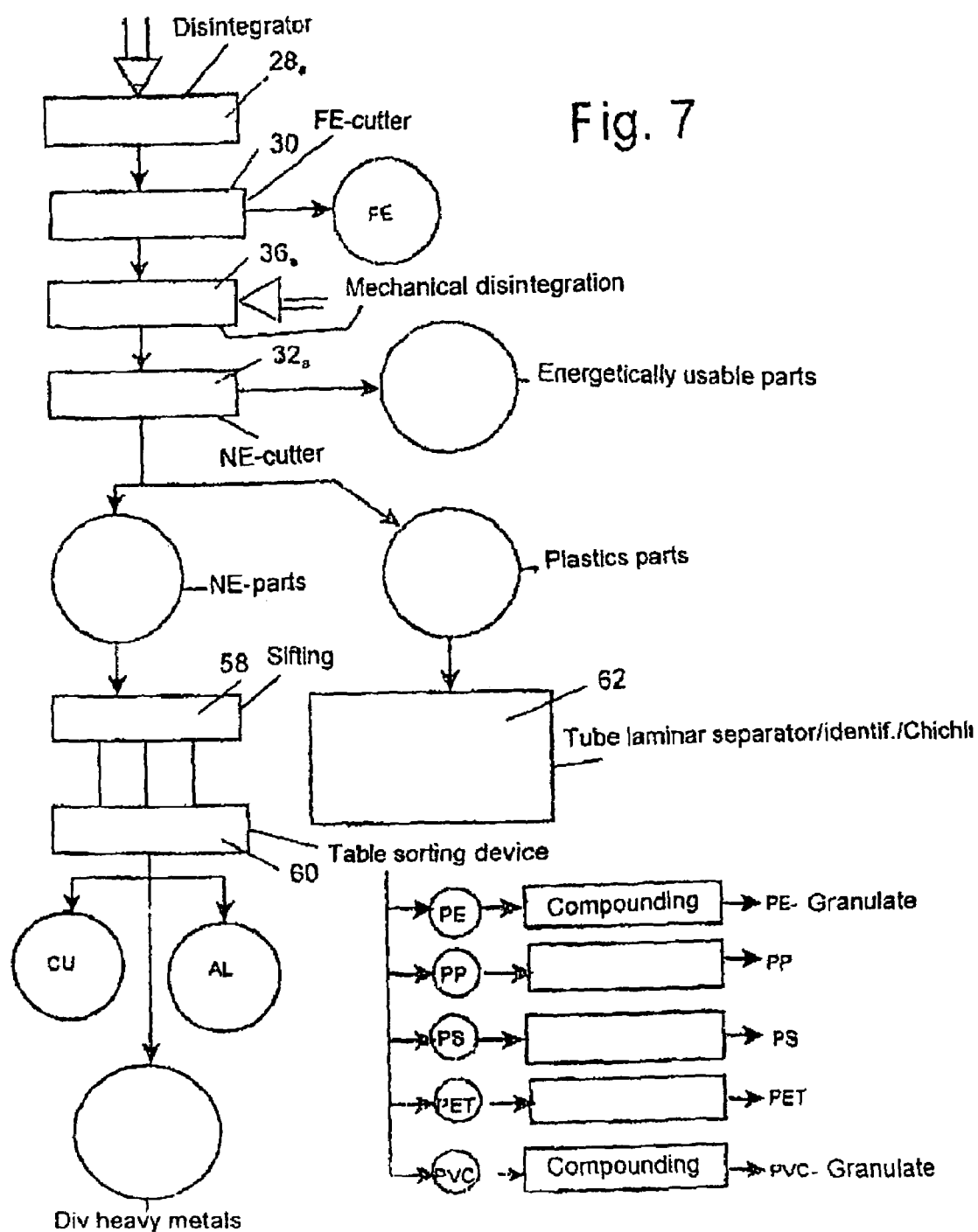

METHOD AND SYSTEM FOR THE TREATMENT OF WASTE

This application is a 371 of PCT/EP03/04510, filed Apr. 30, 2003 (designating the U.S.; and which published in German in WO 03/103859 on Dec. 18, 2003), which claims the benefit of German Patent Application No. 102 19 724.5, May 4, 2002, incorporated herein by reference.

TECHNICAL FIELD

The invention relates to a method and a device for treating waste products and recycling products of solid organic or inorganic materials, or composite materials and mixtures thereof.

BACKGROUND

The above-mentioned waste products include, for example, industrial recycling products such as electronic scrap or slags from metal smelting, but also household waste of various compositions. The latter include primarily organic mixtures such as foodstuffs, plastics packaging, composite packaging, as well as inorganic components such as glass, metals and composites thereof.

These mixtures and composite elements pose problems in particular during disposal, since separation of the mixtures and of the materials contained in the composite has been carried out hitherto either not at all or only inadequately, with high consumption of energy. Most of these waste products are incinerated or dumped. Only waste products with low impurity content—for example cans of aluminium sheet—are subjected to material recovery treatment. More complex waste is not subjected to treatment or material recovery through lack of technical possibilities or the high cost resulting, for example, from wet-chemical processes or thermal processes.

In the conventional mechanical processing procedure, the composite element is broken up by way of the grain or particle size which is smaller than the respective layer thickness of the components. This breaking-up operation is generally effected by using an at least one-stage very fine crushing operation using suitable mills—for example, hammer, impact or counter-flow mills—possibly with the assistance of nitrogen for inerting and cooling purposes.

Known from FR-A-1 562 013 is a comminution mill comprising a rotor having a plurality of rotating discs and a cylindrical housing surrounding said rotor, in which material to be milled is fed by a worm device to the lower end of the rotor and is then picked up by the airflow of a fan disposed across the rotor above a sieve base and below the rotor bearing. The upwardly-impelled milling product is comminuted by so-called plaques de broyage, i.e. milling or crushing plates, which project radially from rotating rotor plates and are arranged close to the housing wall. The ends of the milling or crushing plates co-operating with the housing wall are in each case equipped with elliptical frames; these frames describe a constructed circle against the inner face of the housing and are claimed to assist the milling and comminution effect. Moreover, in the view of the author of FR-A-1 562 613, turbulences are additionally involved in this comminution process. A bypass which recirculates sieved-out coarse particles to the lower intake leads off from the housing of this comminution mill below the fan.

A comminution mill of this kind is also disclosed by DE-A-42 13 274, which machine is used as a micro-fluidised-separator mill for fine comminution of composite materials containing metals, in particular for recovering precious metals, from mounted circuit boards. The copper, for example, is reduced to a grain size of approximately 80 to 100 μm and removed via the separator air. Arranged at an opening of a bypass is a deflector edge which deflects the particles flowing at the periphery of the rotor into the bypass opening. The eddies produced by the rotary motion of the rotor are illustrated in the drawings in the manner of a comic strip phenomenon, without explanation of their significance in terms of process technology.

WO-A 9 305 883 contains a process flow diagram for recovering fibres from glassfibre-reinforced plastics or the like using a shredder, after which the shredded product is pulverised. Liberated fibres are separated from this powder and the remaining pulverised waste is used, for example, as filler. This process diagram contains a micro-mill referred to as a pulveriser which resembles that from FR-A-1 562 013 in construction.

In a process according to WO 95/25595 for treating composite elements of solid organic and/or inorganic composite materials such as composites of metal/metal, plastic/plastic, metal/plastic or mineral composites with metals and/or plastic materials, a mixture is fed to the flow-breakaway edges with an acceleration of 20 to 60 m/sec$^2$ and a movement is established in the eddies which acceleratingly breaks up a mixture. In addition, during this separation or breaking-up procedure the adhesion between the components of the solid particles is overcome by acceleration and frictional forces which exceed the adhesion force, and the components of the solid particles are detached or removed from one another, the layers of the above-mentioned composite material being separated.

The known methods therefore have the object of processing, comminuting, homogenising and partially or wholly separating composite materials and mixtures of materials. Such methods are based in particular on mechanical shearing and crushing, on relatively uncontrolled fragmentation or separation in high-energy eddies.

OVERVIEW

In awareness of these factors it is the object of the invention to develop a method whereby mixtures and composite elements are treated in such a way that the fractions recovered from the process can be fed back as valuable substances into the economic cycles.

This object is achieved by the teaching of the independent claim; the dependent claims specify advantageous refinements. In addition, all combinations of at least two of the features disclosed in the description, the drawings and/or the claims fall within the scope of the invention.

According to the invention the mixtures and composite materials are broken up and separated by means of a mechanical procedure in which the impulse generated by the sudden arresting of a transported particle is utilised. In the composite material or the mixture a breaking-up or separation of the components is effected by a device which suddenly interrupts the flow of said composite material or mixture, by means of an impulse; in and between the layers of the composite elements shockwaves are produced which break up these composite elements. For this purpose it has proved advantageous for process air to be directed in a counter-rotating rising flow path into the spiral-like downward transport path generated in a rotor having a vertical axis; the above-mentioned shockwave is preferably generated between the layers of the composite material against a deflector wall of the rotor.

According to a further feature of the invention two wall faces coaxially arranged at a radial distance from one another rotate relatively to one another about their axis, and the composite materials or mixtures moved by centrifugal forces are moved and broken up between deflector faces projecting radially from the deflector walls. The breaking-up of the composite can occur on impact against a deflector wall and its metal components are deformed spherically; during the deformation process the layer-like metal component is preferably rolled up.

It has proved advantageous to disintegrate the composite element to a particle size of 10 mm to 50 mm before the separation and breaking-up process and optionally also to subject it to thermal pretreatment. In addition, the material discharged from the separation or breaking-up process can advantageously be subjected to a separation and/or sifting process or a process for separating non-ferrous metals.

According to a further feature of the invention the separation is carried out on separator tables and/or by fluidised bed separators, the metal and/or plastics parts being compacted after separation. For this purpose it is advantageous to separate the plastics from one another by turbo-laminar separation and identification and/or to extrude the metal and/or plastics constituents after separation.

Based on inherent material properties—such as density, modulus of elasticity (=stiffness=resistance to deformation), strength and molecular constellation—shockwaves generated according to the invention are disseminated within the materials and have different configurations regarding their propagation velocity, frequency and amplitude. If the forces generated by these shockwaves on impact of the particles exceed the adhesion force of the interfaces—the contact faces between the individual material phases—the resulting micro-shearing leads to detachment or separation. This principle is utilised in a specified and intentional manner according to the invention.

The typical flow behaviour when elastic extension, e.g. for metals, or inherent elasticity, e.g. of plastics, is exceeded results in permanent spherical deformations or in partial elastic restoration of the original particle shape (resilience). As a result of this phenomenon the phase-separated elements of composite materials can be relatively easily sorted using known and established technologies—e.g. on a mechanical, hydraulic or pneumatic basis.

The method described is distinguished by the simplicity and functionality of the device according to the invention, resulting in correspondingly simple and unproblematic operation. The intended simplicity of the concept and construction of the rotor machine described permits its technical realisation without difficulty. The utilisation of knowledge from materials science, of heat treatment processes, of computer- and simulation-aided design optimisation, and the possible adaptation and optimisation of process parameters will further increase the efficiency which can be anticipated.

A device for carrying out the method described, in which the transport path for the composite materials or the mixture inside a rotor is directed against the flow path of process air and in which the material feed device is arranged in the roof area of the rotor, falls within the scope of the invention. The transport path is to be disposed between two relatively movable wall faces spaced at a distance, from which deflector faces offset with respect to one another project into the transport path from both sides.

According to further features of the invention the wall faces are coaxially curved and/or are journalled rotatably in the direction of rotation of the rotor.

Because of the simplicity of the core process and of the separator, and because of the large throughput performance which is apparent, the resulting costs of separation should actually be relatively low. The corresponding costs represent ultimately the total consumption of resources such as transport, energy and labour requirements (always associated with the consumption of resources!), water-air and land consumption, the substitution effect and the like, and consequently the entire environmental impact. If the quantity of successfully treated flows of waste and their conversion into flows of useful materials increases as a result of the economic attractiveness of the process, the resulting substitution would, of course, lead to a corresponding reduction in the consumption of primary resources.

Further advantages, features and details of the invention will be apparent from the following description of preferred embodiments and with reference to the drawings, in which:

BRIEF DESCRIPTION OF THE DRAWINGS

FIG. 1 is a sketch of the process sequence for the breaking-up of a composite element against a deflector wall with three steps;

FIG. 2 shows the transformation of the composite element fed to the deflector wall in four stages;

FIG. 5 to FIG. 8 are process flow diagrams for different process steps.

DESCRIPTION OF EXAMPLE EMBODIMENTS

Figure 3:
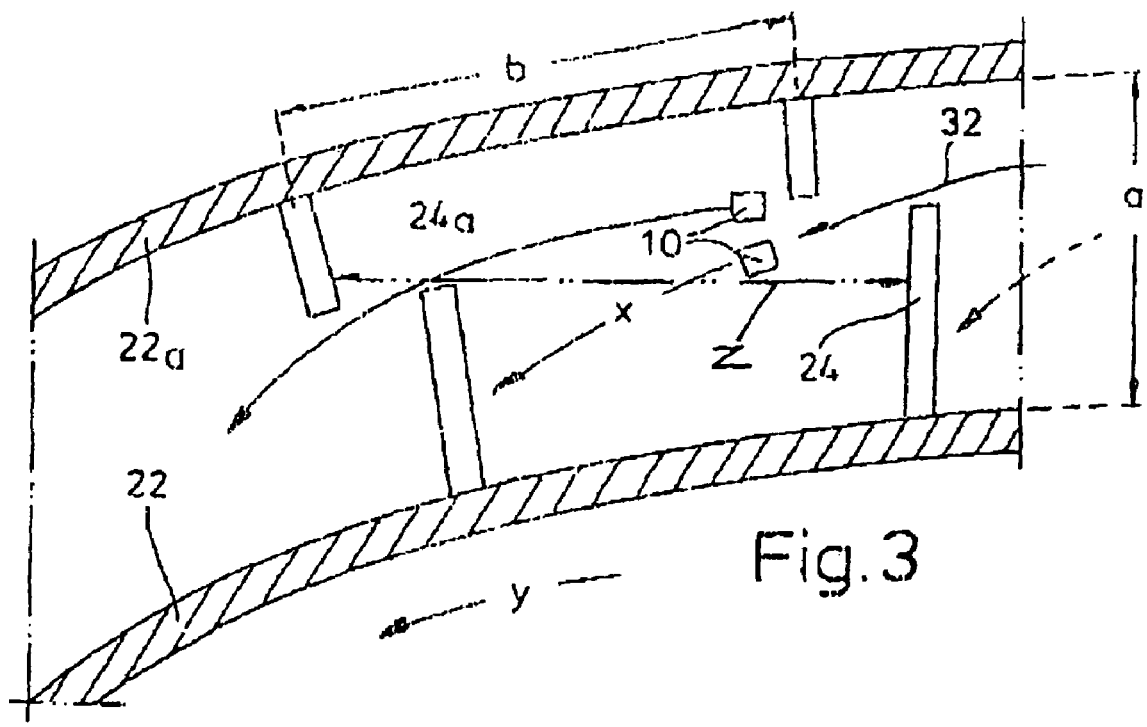
FIG. 3 is a schematic top view of rotating deflector faces during the process.

According to FIG. 1 a composite strip 10 of thickness e having a middle layer 14 of an aluminium alloy covered on each side by PE layers 12 is fed in transport direction x to a deflector wall 20 crossing said transport direction. By virtue of the impulse due to acceleration and of an abrupt cessation of this impulse against the deflector wall 20 and the resulting shockwaves between the layers 12, 14 of the composite strip 10, the physical differences of the different materials—such as thickness, elasticity, ductility and the like—are utilised in such a way that, because of the different behaviour of the components 12, 14 of the composite strip 10, said components separate.

Through the impact against the deflector wall 20 materials liable to deformation—for example the aluminium layer 14—are deformed, whereas elastic materials—that is, the two plastics layers 12—absorb the impact energy with the result that these PE layers 12 do not undergo any—or only a slight—change to their structure. If a composite material 10 is subjected to such a treatment the metal layer 14 is deformed while the plastics layers 12 return after brief deformation to their original state through the restoring force. This different behaviour of the composite materials 12, 14 has the result that a shear force is produced between them which separates the layers 12, 14 along their phase boundaries. In mixtures, breaking-up does not occur; however, because of their physical differences the materials present in the mixture also take on different structures. In this way—depending on the above-mentioned physical properties—different characteristic structures of the materials are produced.

Step b) in FIG. 1 shows the considerable and permanent deformation of the aluminium layer 14 and the very brief deformation of the two plastics layers 12; a shear force is produced at the phase boundaries between the materials of the layers 12, 14.

In step c) of FIG. 1 both the aluminium layer 14—now in spherical form—and the plastics layers 12 rebound against the impulse direction x, the plastics layers 12 having extended again from the deformation situation of step b) as a result of the restoring force. Metals are deformed and thereby attain a spherical structure which results from a rolled-up metal layer 14; these spheres now have a diameter which is a multiple of the previous dimension in their planar structure prior to treatment.

The changes described are made clear in FIG. 2. Step a) shows the initial product 10 with its strip-like layers 12, 14. In b) a progressive breaking-up can be seen; the layers 12 gape apart and the middle Al layer 14 is beginning to roll up in a tongue-like fashion against the impulse direction x. In step c) the middle layer 14 is adopting an increasingly spherical configuration and in step d) it reaches the spherical shape 14; the layers 12 have returned—as described above—to their original shape.

In the FIG. 3 deflector faces 24, $24_a$, which are oriented towards one another, project at a horizontal distance b apart from two wall faces 22, $22_a$ of parallel curvature and spaced apart by a clear radial distance a, one of the wall faces 22 rotating in direction y relatively to the other wall face $22_a$, and in the transport direction x of composite materials 10. A line indicating an impact motion of particles is denoted by z.

Figure 4:
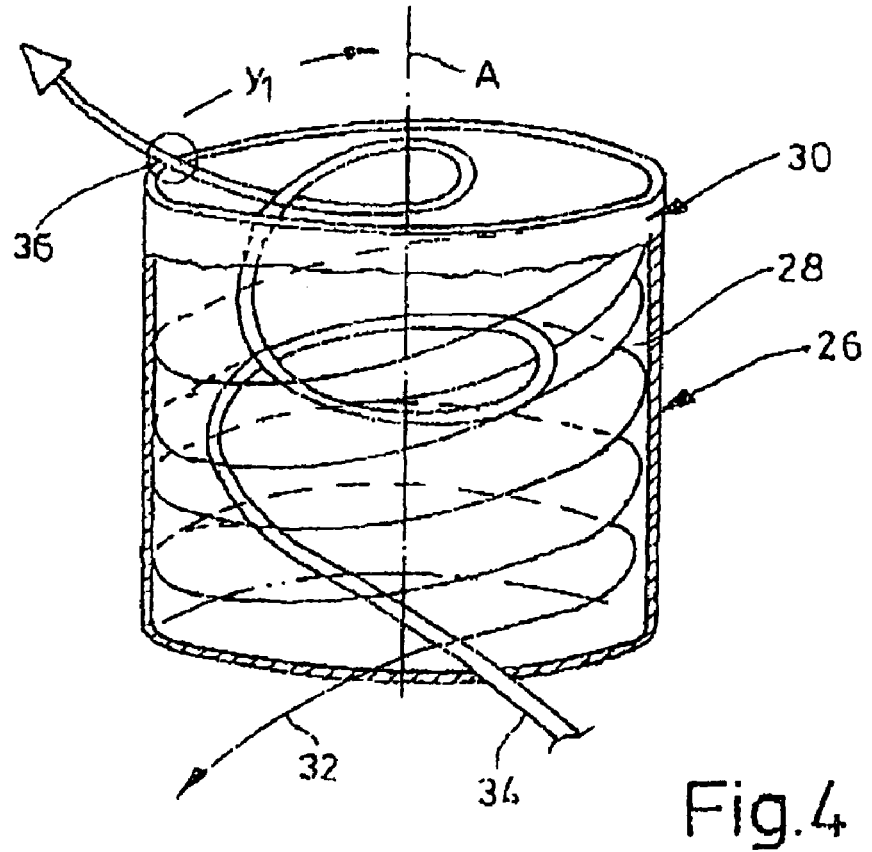
FIG. 4 is a sketch showing a side view of a rotor.

In FIG. 4 a rotor 26 with a direction of rotation $y_1$ about the rotor axis A is indicated, to which rotor 26 a mixture of materials is fed from above at 30. The composite materials 10 of the mixture are directed downwardly by gravity—the spiral transport path is indicated by 32. Introduced from below is process air the flow path 34 of which runs counter to the transport path 32. The dwell time of the composite materials 10 in the rotor chamber 28 is influenced by the rising air and easily dispersable particles and dusts are carried away in a cyclone and leave the rotor 26 with the process air at 36.

The energy recovery of the process can be seen from FIG. 5; not shown here are the normal sequence steps during mechanical pre-treatment using a bale opener—optionally in the form of a ball-type crusher—and a drying station, a pre-disintegrator, an Fe separator and a non-ferrous materials cutter. From the dryer, waste reaches a filter while useful recoverable materials are taken from the cutters to a mechanical processing station. Arranged below the non-ferrous materials cutter is a thermal recovery station for substances recoverable as energy (residual organic material). The elements illustrated are a mixer or charging device 40 ahead of a dosing device 42 followed by a station 44 for rotating-pipe gasification or fluidised bed combustion. This station produces slag or ash, as well as gas which is fed to a combustion boiler 46. Steam flowing from the latter reaches a steam turbine 48 for generating electrical energy. Heat removed from the combustion boiler 46 is fed to a mechanical pre-treatment process 50. In the lower area of this flow diagram it is indicated that the slag or ash from the rotary-pipe gasification process 44 is fed through a discharge pipe 52 to a KBS[1] process—used for manufacturing a ceramic or hydraulic binder; this is indicated in FIG. 6. Here additional materials are supplied in a mixer or charging device $40_a$. After mixing, dosing is carried out in a dosing device $42_a$ from which the bulk material reaches a mill 54 which produces hydraulic binder.

[1]=ceramic binder system

In the mechanical processing stage according to FIG. 7 a disintegrator $28_a$ is followed by an Fe cutter 30 at the outlet 31 of which a station $36_a$ for mechanical disintegration is located, which is followed by a non-ferrous materials cutter $32_a$. At this station non-ferrous constituents and plastics constituents are separated on one hand and constituents recoverable in the form of energy on the other. The non-ferrous fractions are passed to a sifting station 58 having a table sorting device 16 from which the fractions of copper, light metal and various heavy metals are removed.

The plastics constituents from the non-ferrous materials cutter $32_a$ reach a separator 62 which separates them into fractions of PE; PP; PS; PET and PVC. These substances are transported in each case to compounding stations from which the corresponding granulate is removed.

Figure 8:
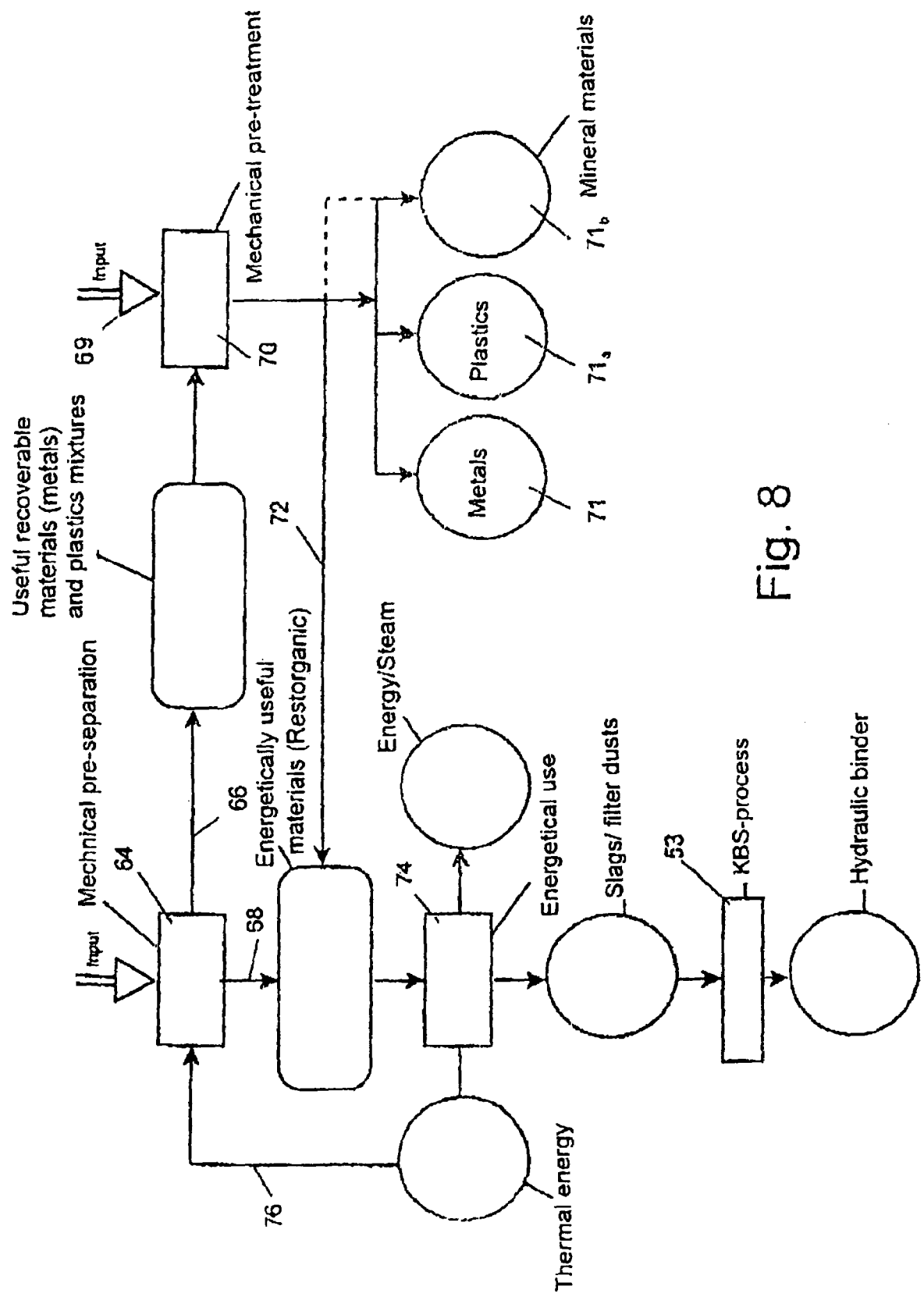

FIG. 8 shows a process flow diagram for household waste. This waste is subjected as input material to mechanical pre-treatment at 64; useful recoverable materials such as metals, plastics mixtures and the like—in particular heavy metals—pass through a discharge outlet 66 to a mechanical processing station 70 which can also be reached by pre-sorted industrial waste 69. Heavy metals are removed from the waste and slag quality material is produced as the starting product for hydraulic binders.

Substances recoverable as energy are passed through a discharge outlet 68 for further treatment. The fraction of useful recoverable materials is processed mechanically and separated into up to four fractions, denoted by 71 (metals), $71_a$ (plastics) and $71_b$ (mineral substances). Also present is a fraction recoverable as energy which is conducted via the line 72 to this bulk material from the discharge outlet 68. The collected fraction of substances recoverable as energy is treated in station 74 by means of an energy process and the resulting thermal energy is fed back to the mechanical separation process at 76.

Slags and filtered dusts from the energy recovery process 74 reach station 53 with the KBS process, from which a hydraulic binder is extracted.

The invention claimed is:

1. A rotor configured to treat waste or recycled material, comprising;
    a rotor housing having a center axis and configured to receive a material;
    an inner deflector wall within the rotor housing configured to rotate about the center axis, wherein rotation of the deflector wall decomposes the materials into components, the rotation of the deflector wall causes the material to move in a substantially helical transport path in a first direction;
    an outer deflector wall concentric with the inner deflector wall and separated by a gap in which the material moves between the inner and outer deflector walls, the inner and outer deflector walls each including at least one protrusion extending therefrom toward the gap and offset from one another, wherein the material decomposes upon striking the protrusions; and
    a port configured to inject process air into the rotor housing, wherein the air moves in a substantially helical airflow path in a second direction opposite to the first direction.

2. The rotor of claim 1, wherein the material is a composite having a metal component, wherein the metal component is deformed into a substantially sphere-like shape upon being decomposed.

3. The rotor of claim 1, wherein the material includes particles entering the rotor housing are between and including 10 mm and 50 mm in size.

4. The rotor of claim 1, wherein the first direction of the transport path is downward and the second direction of the airflow path is upward with respect to the rotor housing.

5. The rotor of claim 1, wherein the process air expedites removal of the components from within the rotor housing.

* * * * *